United States Patent [19]
Klaue

[11] 4,062,427
[45] Dec. 13, 1977

[54] WHEEL AND DISK BRAKE ASSEMBLY FOR MOTORCYCLES

[76] Inventor: Hermann Klaue, Tour d'Ivoire 24 e, 1820 Montreux, Switzerland

[21] Appl. No.: 664,290

[22] Filed: Mar. 5, 1976

[30] Foreign Application Priority Data

Mar. 29, 1975 Germany .............................. 2514086
Sept. 5, 1975 Germany .............................. 2539544

[51] Int. Cl.² .......................... B60T 1/06; F16D 65/12
[52] U.S. Cl. ...................................... 188/18 A; 188/26; 188/71.6; 188/72.4; 188/72.7
[58] Field of Search ...................... 188/18 A, 18 R, 17, 188/26, 71.6, 72.1, 72.4, 72.5, 72.6, 72.7, 72.8, 73.2, 366, 264 AA, 218 XL, 71.3; 192/113 R, 70

[56] References Cited

U.S. PATENT DOCUMENTS

| 2,251,539 | 8/1941 | Ash | 188/264 AA X |
| 3,776,597 | 12/1973 | Camps | 188/26 X |
| 3,971,457 | 7/1976 | Campagnolo | 188/26 X |

FOREIGN PATENT DOCUMENTS

351,179   2/1961   Germany .............................. 188/72.8

*Primary Examiner*—Trygve M. Blix
*Assistant Examiner*—Douglas C. Butler
*Attorney, Agent, or Firm*—Stevens, Davis, Miller & Mosher

[57] ABSTRACT

A brake disk assembly for a motorcycle wheel has a radially extending carrier integral with the hub and supporting a brake actuating member. The brake actuating member presses the friction lining of a brake disk against a brake ring on the wheel. In one embodiment of the invention only one brake actuating member is used and the two brake rings on opposite sides of the wheel are connected by a rod-like member. When the brake disk on one side of the wheel is actuated by pressing one brake disk against its brake ring, the latter brake ring presses the opposite brake ring through the connecting rod against the second brake disk. The actuating members may be either mechanical or hydraulic.

15 Claims, 8 Drawing Figures

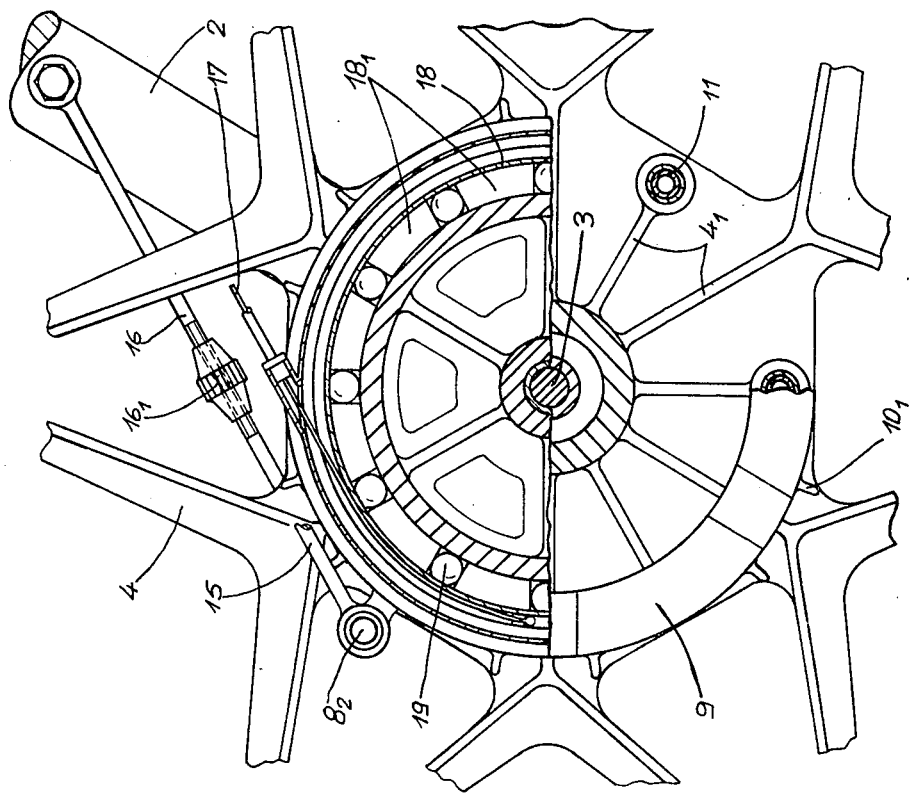
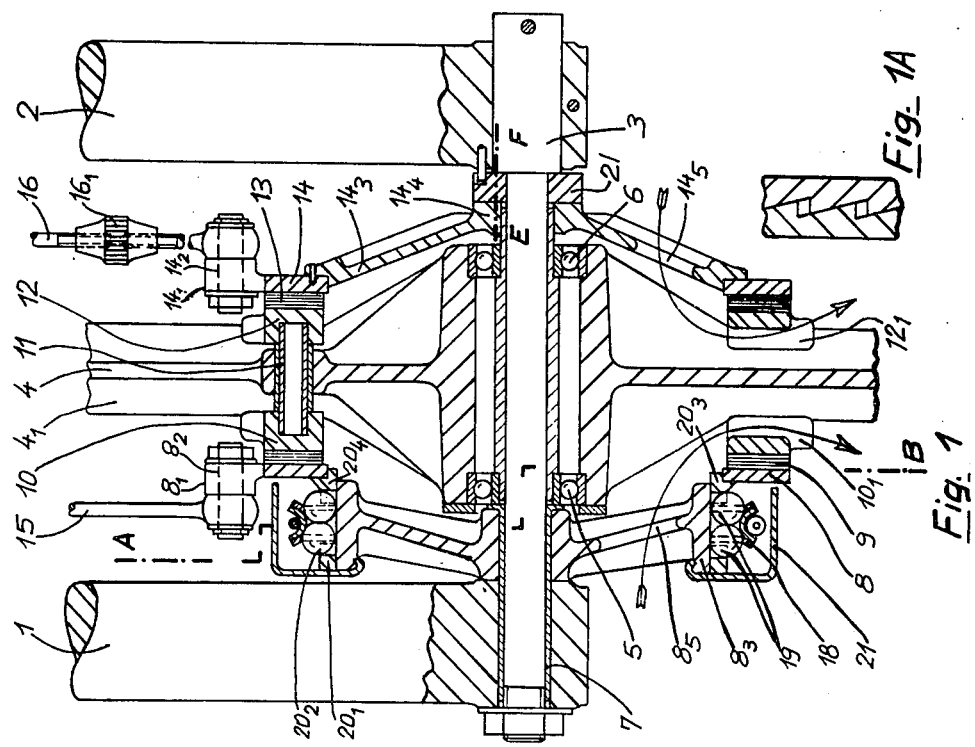
Fig. 2 (A-B)
Fig. 1A
Fig. 1

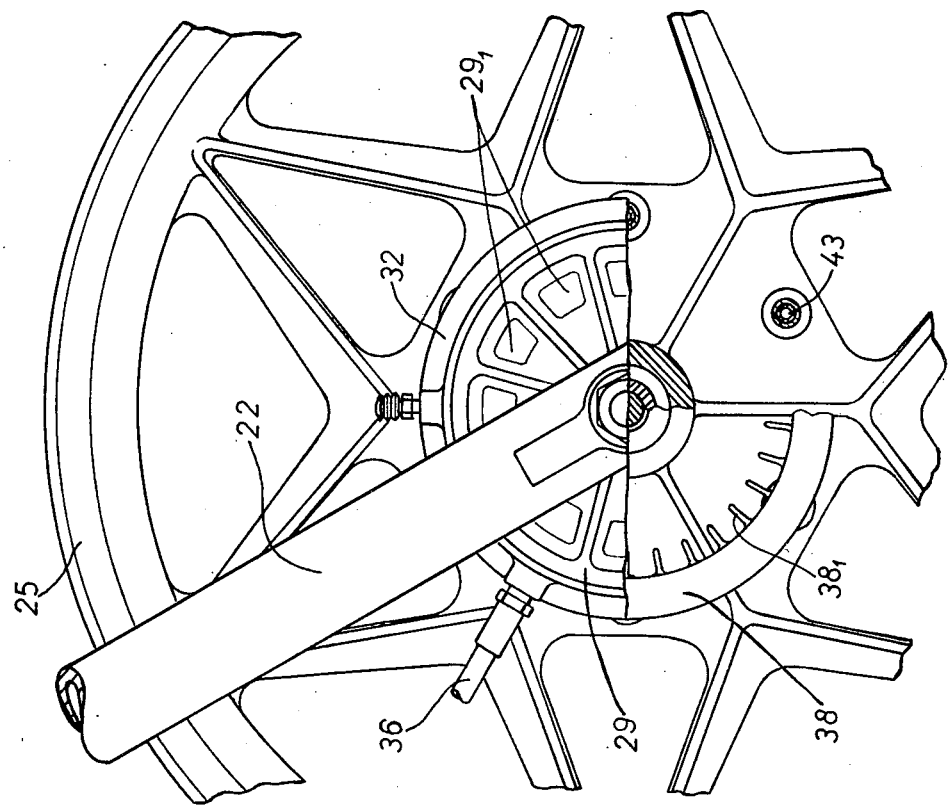
Fig. 7 (J-K, L-M)
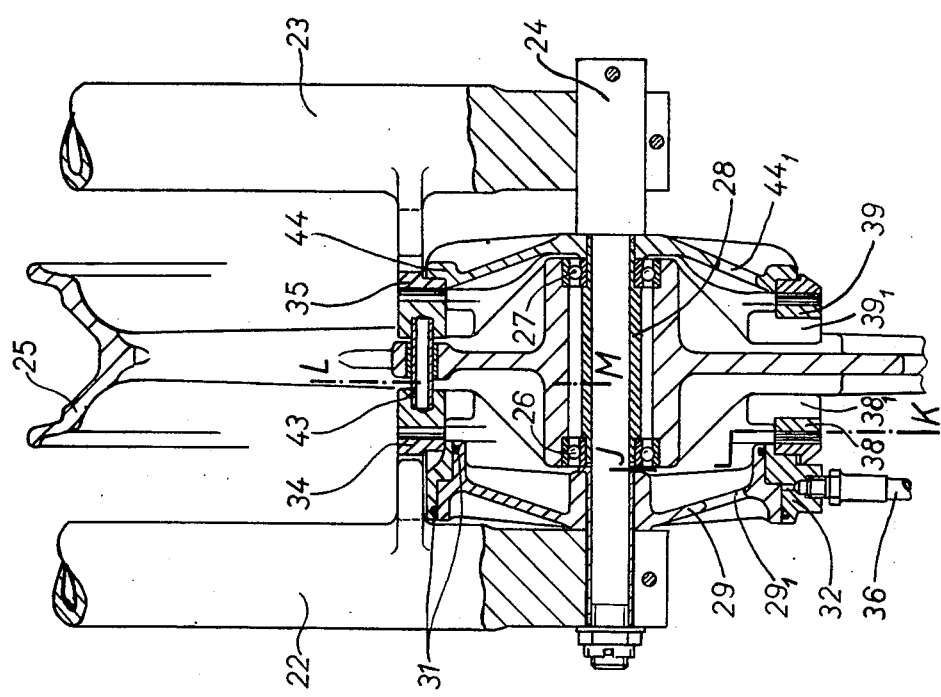
Fig. 6

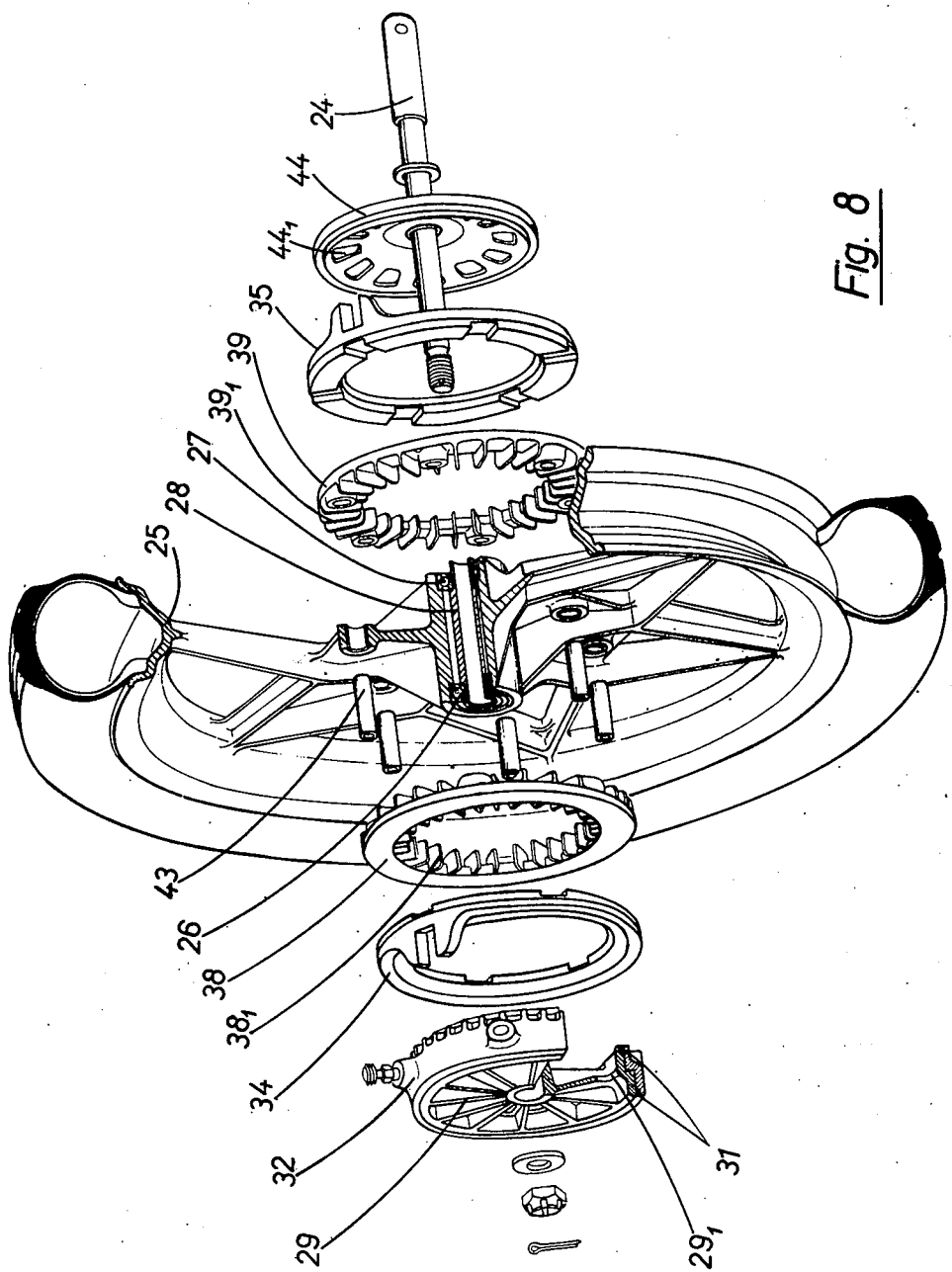

WHEEL AND DISK BRAKE ASSEMBLY FOR MOTORCYCLES

Disk brakes are gaining popularity for motorcycles due to their flat frictional lock and other favorable characteristics. Originally partial disk brakes similar to those used in passenger cars were used on motorcycles but such brakes have thermal disadvantages because the specific load on the friction surfaces of the brakes is relatively high. Accordingly, the development in motorcycle brakes has been proceeding in the direction towards fully lined disk brakes. Thus double-disk brakes are known for motorcycles in which the wheel hub is provided on both sides with flat or conical run-on surfaces against which two disks or conical rings provided with brake lining are pressed by hydraulic actuating systems. This solution has the disadvantage that the heat is conducted into the hub or the wheel. In order to take up the heat, the entire wheel hub must be made of gray cast iron which brings about great technical disadvantages in travel due to the increase in the masses which are not spring mounted. In another solution using a light-metal hub, rings of gray cast iron or steel must be placed on top or cast into them. The heat transfer to light-metal, particularly in case of high thermal stresses, is however problematical because of the difference in thermal expansion of the two metals. Furthermore, for the reasons indicated it is impossible to manufacture hubs or wheels of plastic instead of metal.

An object of the present invention is to provide a brake for motorcycles in which the hub and/or the wheel is released from thermal stress. Another object of the invention is to provide a ventilated disk brake assembly for a motorcycle.

Other objects will become apparent from the following description with reference to the accompanying drawing wherein:

FIG. 1 is a fragmentary longitudinal section of a motorcycle front wheel and an embodiment of a disk brake assembly provided by the invention;

FIG. 1A is an enlarged fragmentary view taken along the line E-F of FIG. 1;

FIG. 2 is a side view taken along the line A-B of FIG. 1;

FIG. 3 is a fragmentary longitudinal section of a front wheel of a motorcycle and a second embodiment of the disk brake of the invention;

FIG. 6 is a fragmentary longitudinal section of a front wheel of a motorcycle and a third embodiment of the disk brake of the invention;

FIG. 7 is a side view taken along the lines J-K and L-M of FIG. 6; and

FIG. 8 is an exploded view of the embodiment of the FIGS. 6 and 7.

The invention provides a double-disk brake with brake disks arranged on both sides of the wheel hub, their brake linings being brought into frictional contact with oppositely located disk surfaces of brake rings and in which the brake rings are so connected by extensions with the hub that cooling air can flow through radial recesses between the brake rings and the hub.

As a further development of the invention, the brake rings are provided with radial ribs on the hub side.

In still a further development of the invention, the annular mechanical or hydraulic actuating device is arranged only on one side of the hub or wheel and the parts of the brake which rotate together with the hub or wheel are formed of axially displaceable rings which are connected with each other by bolts, sleeves or the like, the parts connecting the rings passing through the wheel hub or the wheel.

In still another development of the invention, the brake disks which are provided with brake linings are applied by annular or stepped pistons which are acted on hydraulically. The supporting rings which support the annular stepped pistons are provided with openings through which the cooling air can penetrate into the radial spaces between the brake rings and the hub.

Figure 4:
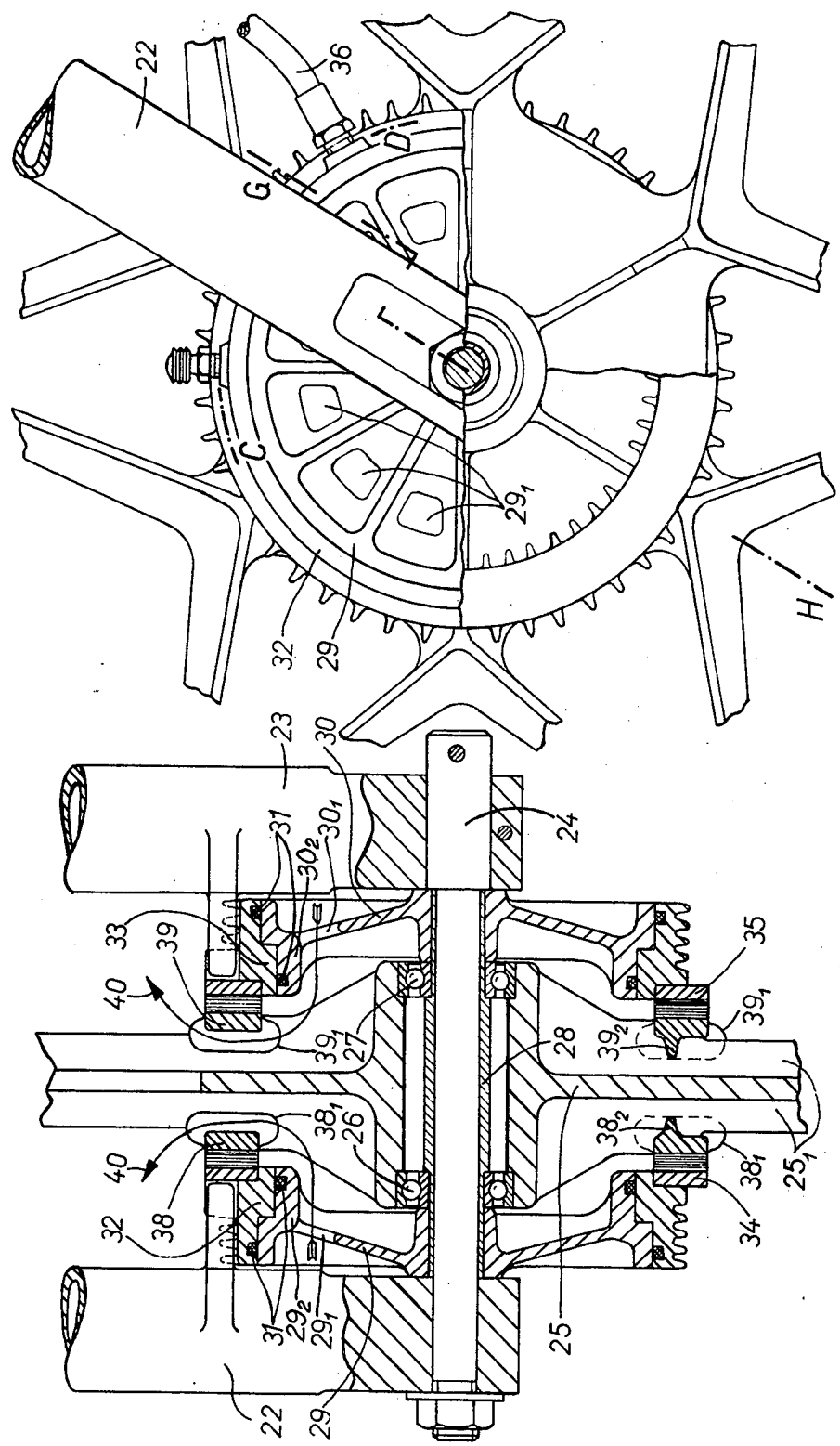
FIG. 4 is a side view of the embodiment of FIG. 3.
Figure 5:
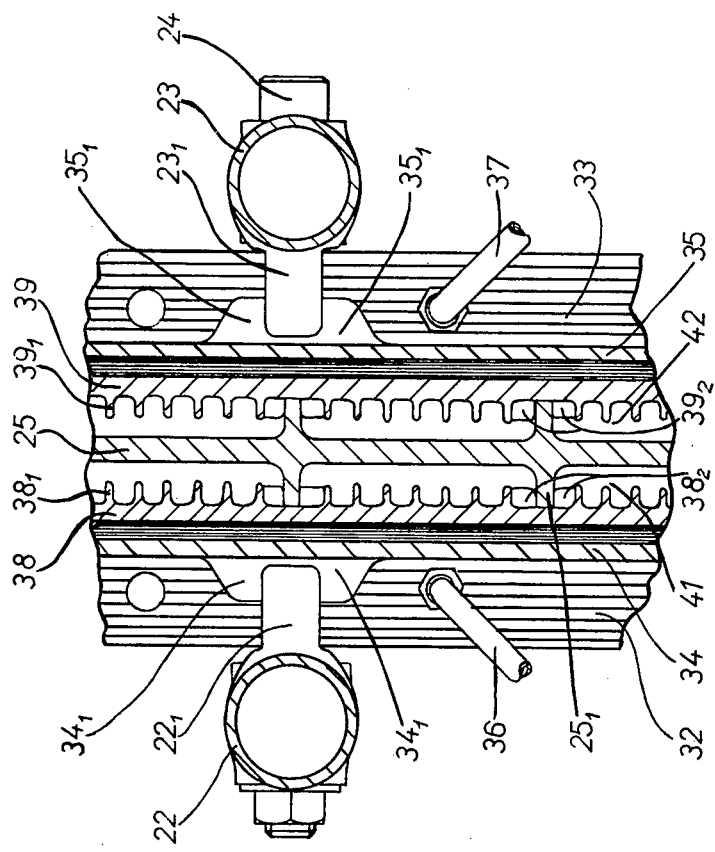
FIG. 5 is an enlarged fragmentary view taken along the line C-D of FIG. 4.

Various embodiments of the invention are shown by way of example in the accompanying drawing. In FIGS. 1 and 2 there is shown the front wheel brake of a motorcycle which is mechanically actuated on one side. In order that both brake disks can be applied with the same force of application, the extensions of the two brake disks which are developed as hollow bolts are supported for axial movement in the wheel spokes. FIGS. 3 to 5 show a front wheel brake with hydraulic stepped ring actuation on both sides.

The unilateral mechanical tightening of the brake construction of FIGS. 1 and 2 can also be replaced by a unilaterally acting hydraulic actuation of the embodiment of the brake shown in FIG. 3. The development with unilateral hydraulic actuation is shown in FIGS. 6, 7 and 8.

In FIGS. 1 and 2, 1 and 2 represent the ends of the two fork members and 3 is a removable spindle on which a light-metal or polyamide (nylon) wheel 4 is supported by means of two ball bearings 5 and 6. An actuation carrier or support $8_3$ is suspended on a bushing 7 about axle 3 and extending through a bore through fork member 1. Upon removal of wheel 4, actuation carrier $8_3$ remains fastened to the fork member 1. A brake disk 8 is centered on carrier $8_3$. Brake disk 8 is provided on the side thereof facing the wheel with segmented disk friction lining 9 which fully lines the brake ring 8 and, upon braking, is pressed against the brake ring 10 which is preferably made of a gray cast iron casting. Openings $8_5$ provide for air flow through carrier $8_3$. The brake ring 10 on one side of the wheel is connected in force-locked manner in axially displaceable fashion with the brake ring 12 on the opposite side of the wheel by bushing 11 which passes through the wheel body 4 and transmits the braking torque from the brake rings to the wheel. Upon braking, the brake ring 12, without transmitting any lateral force to the wheel support, comes against the segmented disk brake friction lining 13 which fully lines the second brake disk 14. Brake disk 14 is supported by disk $14_3$ and is fixed in position both axially and circumferentially. The transmission of the torque is effected in the case of the brake disk 8 via the lug $8_1$ and bolts $8_2$ by the connecting rod 15 which is suspended on the steering member or handle bars. Adjustable rod 16 is also suspended from the steering member and is connected with the brake disk 14 via the lug $14_1$ and bolt $14_2$. In order to adjust the slack of the brake the supporting disk $14_3$ has projections $14_4$ which ascend in the circumferential direction (FIG. 1A) and rest on a mating piece $2_1$ which is connected with the fork tube 2 and developed as a mirror image. By turning the turn buckle $16_1$ the brake disk 14 is moved axially whereby the brake clearance of the entire brake can be adjusted.

Actuation of the brake is effected via a Bowden cable 17 which, upon actuation, turns a ring 18 which acts via projections $18_1$ on a pair of balls 19 which rest, in the actuating carrier, on a supporting ring $20_1$ having ascending paths $20_2$. The brake disk 8 has a supporting ring $20_3$ with mirror-image paths $20_4$ which ascend in circumferential direction, via which the balls 19 exert an axial pressure upon the turning of the ring 18. In this way the lining 9 of the brake disk 8 is pressed against the brake ring 10 which rotates with the wheel. The brake ring 10 transmits this axial force via the sleeves 11 to the brake ring 12 which rests on the lining 13 of the fixed brake disk 14 on the opposite side of the wheel. The actuating mechanism is protected by a sheet metal cap 21.

While in the brake embodiment of FIGS. 1 and 2 both brake rings are firmly connected in the direction of the actuating pressure with respect to the wheel but however axially movable, the brake rings in the case of the brake of FIGS. 3, 4 and 5 are firmly connected with the wheel also in the direction of the actuating pressure. This solution then requires separate brake actuations on both sides of the wheel.

In the example of FIGS. 3 to 5, 22 and 23 are the two fork ends and 24 is the removable axle on which the wheel 25 is supported on the two ball bearings 26 and 27. On the sleeve 28 there are supported the carrier rings 29 and 30 which terminate as inner stepped rings $29_2$ and $30_2$ of hydraulic actuation mechanisms. The outer stepped rings 32 and 33 of the hydraulic actuation mechanism are seated on the inner rings $29_2$ and $30_2$. The interface is sealed by sealing rings 31. Brake disks 34 and 35 are supported on outer rings 32 and 33. Brake disks 34 and 35 are provided with brake linings and transmit their braking moment via extensions $34_1$ and $35_1$ to the lugs $22_1$ and $23_1$ on the fork ends. When oil under pressure is fed to the stepped ring cylinders via the hoses 36 and 37, the outer step rings 32 and 33 press the friction linings of the brake disks 34 and 35 against the opposing disk surfaces of the brake rings 38 and 39 which rotate with the wheel. The brake rings which are provided with radial ribs $38_1$ and $39_1$ on the sides thereof facing the wheel are suspended by extensions $38_2$ and $39_2$ on the radial ribs $25_1$ of the wheel in the brake actuating direction and in the circumferential direction in such a manner that they can expand freely upon becoming heated. Cooling air is drawn in from the outside through the openings $29_1$ and $30_1$ as a result of the ventilating action of the cooling ribs $38_1$ and $39_1$ as well as of the ribs $25_1$ of the wheel and passes in the direction indicated by the arrows 40 through the spaces 41 and 42 between brake rings and wheel.

In the case of the embodiment of the brake shown in longitudinal section in FIG. 6, in side view in the upper half of FIG. 7 and in cross section along the plane marked J-K and L-M respectively in FIG. 6 in the lower half of FIG. 7, and finally in FIG. 8 in a perspective exploded view, the reference numbers employed in FIGS. 3 to 5 have been used. In this embodiment, however, the stepped-ring actuation mechanism 29, 32 is provided only on one side of the brake and the brake rings 38 and 39 are connected with each other in this case in axial and circumferential direction by means of bushings 43. The axial pressure exerted by the step ring actuation upon braking is taken up by the disk 35 provided with a brake lining, which disk rests axially firmly against the supporting ring 44 which has openings $44_1$. Although in this embodiment a one-sided hydraulic actuation is provided, the wheel bearings also remain free of reaction. The axial forces exerted by the brake upon braking are taken-up by the spindle shaft 24.

Although the invention is described in detail for the purpose of illustration, it is to be understood that such detail is solely for that purpose and that variations can be made therein by those skilled in the art departing from the spirit and scope of the invention except as it may be limited by the claims.

What is claimed is:

1. A disk brake assembly for a vehicle wheel having a hub which is rotatably mounted on an axle, said assembly comprising first and second brake rings radially spaced from the hub and fixed on opposite sides of the wheel, first and second brake disks fully lined with a segmented friction lining disposed on opposite sides of the wheel each with its friction lining facing the first and second brake ring, respectively, a disk shaped carrier on each side of the wheel and supporting the said brake disks against rotation in their positions facing the brake rings, openings through said carriers for flow of air therethrough and over the brake rings for cooling the brake rings, means for actuating the first brake disk by moving it axially into pressing engagement with the first brake ring and circumferentially spaced means connecting the two brake rings which press the second brake ring against the friction lining of the second brake disk in response to axial movement of the first disk ring.

2. A disk brake assembly for a motorcycle wheel comprising a hub, brake rings secured on opposite sides of the wheel for rotation therewith, a disk brake having a friction lining facing each brake ring, means for supporting each brake disk against rotation with the wheel in said position, means for actuating the brake by contacting each brake ring with the facing friction lining, a support member integral with the hub on one side of the wheel supporting the actuating means and a supporting member on the opposite side of the wheel supporting one of the brake disks, said supporting members having circumferentially spaced openings therethrough between the hub and brake rings for flow of cooling air over the brake rings, and means connecting the brake rings whereby when one brake ring is moved axially the other brake ring is also moved axially.

3. The disk brake assembly of claim 2 wherein a brake actuator means is disposed on only one side of the wheel and a sleeve is slidably disposed through an opening in the wheel with its ends contacting brake rings on opposite sides of the wheel, whereby when the actuator means presses the brake disk on its side of the wheel against the brake ring and against the sleeve, said sleeve presses the brake ring on the opposite side of the wheel against the brake disk on that side of the wheel.

4. The brake disk of claim 2 wherein the brake rings comprise radial cooling ribs.

5. The brake disk assembly of claim 2 wherein the said supporting members are carriers for the actuator means and are concave towards the wheel, said carriers having circumferentially spaced openings therethrough for flow of cooling air to the brake rings, the said carrier on one side of the wheel terminating at its radial exterior side in an annular axial flange, an annular ring semi-elliptical in cross-section radially spaced from the said flange, circumferentially spaced pairs of balls axially disposed with respect to each other and disposed between the said annular semi-elliptical ring with the curved surface of the ring following the contour of the surfaces of the balls exposed thereto, a supporting ring having an inclined surface disposed against the radially inward edge of the brake disk, means for turning the semi-elliptical ring and thereby exerting an axial pressure through the balls against the brake disk, an annular groove in each brake ring and elongated rigid members disposed axially through the wheel with an end in each of said grooves whereby upon actuation of said means for turning the semi-elliptical ring said elongated rigid members are pressed axially by the brake ring adjacent to the said supporting ring which in turn presses the opposite brake ring against the friction linings of a brake disk fixed against rotation with the wheel.

6. The disk brake assembly of claim 2 wherein said supporting members are disk shaped carriers for a brake actuating means each terminating at its radially exterior side in a first part of a stepped ring cylinder, a mating part of a stepped ring cylinder slidably disposed on the said first part, said mating part of the stepped ring cylinder being disposed against the brake disk on its side of the wheel, and means for introducing a fluid under pressure into the ring cylinder.

7. The disk brake assembly of claim 2 wherein said supporting members are disk shaped carriers for a brake actuating means, one of said carriers terminating at its radially exterior side in a first part of a stepped ring cylinder, a mating part a stepped ring cylinder slidably disposed on the said first part, said mating part of the stepped ring cylinder being disposed against the brake disk on its side of the wheel, means for introducing a fluid under pressure into the ring cylinder, an annular groove in each of the brake rings, a connecting member extending between the brake rings through an opening in the wheel with an end in each of said grooves whereby actuation of the step cylinder moves the brake disk adjacent thereto against its opposite brake ring and said brake ring on the opposite side of the wheel is moved against a brake disk fixed against rotation with the wheel.

8. An assembly for braking a vehicle wheel comprising a hub, a braking ring disposed at each side of the wheel, a means for supporting each of the braking rings, a disk brake having a friction lining facing the brake ring on each side of the wheel, means on only one side of the wheel for actuating the brake by bringing a first of the said friction linings and a first of the said brake rings into contact, means responsive to relative movement between the said first friction lining and said first brake ring for bringing the second of said friction linings into contact with the second of said brake rings, and means for supporting the disk brakes and their actuating means in said facing position, one of said supporting means being mounted for rotation with the wheel and the other being fixed against rotation with the wheel.

9. The assembly of claim 8 wherein the brake rings are mounted directly opposite each other on opposite sides of the wheel for rotation therewith, a bore is disposed through the wheel, each brake ring has a bore extending axially only partially therethrough and communicating with the bore in the wheel, an elongated member is disposed through the bore in the wheel and has an end seated in each of the bores in the brake rings, a disk brake is disposed on each side of the wheel and has a friction lining facing each of the brake rings, means for supporting each of the disk brakes against rotation with the wheel, and means for moving only one of the brake disks axially against one brake ring and thereby moving said elongated member axially to move the other brake ring against the other brake disk.

10. The brake assembly of claim 9 wherein the brake actuating means is mechanical.

11. The assembly of claim 9 wherein the brake actuating means is actuated by a fluid under pressure.

12. The assembly of claim 11 wherein the brake actuating means is a pair of stepped rings slidably disposed on each other and a means is provided for introducing a fluid under pressure into the interface between the rings to move the rings axially relative to each other.

13. The assembly of claim 9 having a plurality of circumferentially spaced bores in the wheel and cooperating bores in the brake rings and elongated members in the bores.

14. The assembly of claim 8 wherein a brake ring is fixed on each side of the wheel for rotation therewith, a brake disk is disposed with its friction lining facing each brake ring, means for actuating each brake disk axially in response to fluid pressure into contact with the brake ring, and means for supporting the brake disks and means for actuating the brake disks against rotation with the wheel.

15. The assembly of claim 14 wherein the brake actuating means are rings having stepped surfaces slidably disposed on each other and means for introducing a fluid under pressure between the surfaces to move the rings axially relative to each other.

* * * * *